E. STEBBINGS.
COUPON SYSTEM.
APPLICATION FILED JUNE 22, 1921.

1,394,262. Patented Oct. 18, 1921.

THIS COUPON IS WORTH ___15___ TO ITS USER

Listen to this!

I have used various makes of _____, but
_____ Are Not Only GOOD ---, But The BEST John Jones
Boone La.

This coupon, if presented to any authorized agent for
_____ within _____ will be honored as a
credit memorandum to the amount of _____
to apply on the purchase price of _____
of any _____ of our make.

(Vendor's Signature)

Sales or Cancellation Record

Inventor
Eugene Stebbings
By Bair & Freeman
Attorneys

Witness
D. L. Cope

UNITED STATES PATENT OFFICE.

EUGENE STEBBINGS, OF DES MOINES, IOWA.

COUPON SYSTEM.

1,394,262. Specification of Letters Patent. Patented Oct. 18, 1921.

Application filed June 22, 1921. Serial No. 479,618.

*To all whom it may concern:*

Be it known that I, EUGENE STEBBINGS, a citizen of the United States, residing at Des Moines, in the county of Polk and State of Iowa, have invented a certain new and useful Coupon System, of which the following is a specification.

The object of my invention is to provide a coupon system comprising three sections, each section having data thereon, relating to its use.

Still a further object is to provide such a coupon which is divided into sections, one of the sections being a testimonial of the user of the commodity mentioned in the coupon. The intermediate section being a statement by the vendor of the commodity. While the lower or last section is a statement or other record by the agent of the vendor.

With these and other objects in view my invention consists in the construction, arrangement and combination of the various parts of my coupon system, whereby the objects contemplated are attained, as hereinafter more fully set forth, pointed out in my claim, and illustrated in the accompanying drawing.

The drawing shows the plan view of one of my coupons, showing the three sections thereof.

In the accompanying drawing I have used the reference character A to indicate generally a sheet of paper, which is provided with an upper section 10, an intermediate section 11, and a lower section 12.

The sections 10 and 11 are separated by a line 13, while the sections 11 and 12 are separated by a line 14.

The section 10, which I call the upper section may properly be called a testimonial section.

The upper section is provided with the following data "This coupon is worth ———— to its users". The blank portion as referred to by the reference 15, may be stamped with any amount desired as a dollar or so.

The section 10 is also provided with a testimonial in which the user of a certain commodity for which my coupon is being used makes a statement to the effect that he has used various makes of goods but says that the make of goods for which the coupon is being used is the best.

The user of the goods signs his name upon the blank line provided for that purpose, as referred to by the reference 16, and below signs his address as at 17.

It will be understood that the blank lines in the testimonial portion of the section 10 is filled in with the name of the vendor of the commodity for which the coupon is being used.

It will be seen that the section 10 serves as a statement recommending the goods by one who has used the goods, and at the same time serves for designating the value of the coupon.

The intermediate section referred to by the reference 11 is a statement by the vendor of the goods which states that the coupon after presentation to an authorized agent of the vendor within a certain specified time will be recognized as a credit by any of the agents for a specified amount for the purchase of any of vendor's goods from the agent.

Blank lines 18 are provided on the section 11 so that the vendor's name may be placed thereon.

The lower section referred to by the reference 12 serves as a sales or cancellation record, that is when the agent has received the coupon and has given the purchaser the credit allowed by the coupon he makes his remarks as to the transaction on the section 12 of the coupon, signs his name to the section 12, and the coupon may then be returned to the vendor so that the agent may receive his proper credit.

Having described the parts of the coupon, I will now describe the method or way in which the coupons are put into circulation.

When a person buys from the agent certain goods he is given a book of coupons, he then signs his name to the section 10 which is a testimonial section and may then pass out the coupons to his friends who use the coupons, getting the credit allowed for them.

The agent then gives another book of coupons to the later purchaser.

When the coupons are eventually returned to the vendor, the vendor knows exactly who signed the testimonial, and allows the signer of the testimonial a certain credit on any goods which he may in the future buy, or may allow a cash credit.

In this way the purchaser receives a direct credit upon all the goods that he buys and later he receives in addition thereto a credit from the vendor for the goods bought by his friends on his recommendation.

The coupon makes it possible to do away with the expensive advertising which the consumer gets no benefit of. The coupon gives the desired advertising and publicity effect to the vendor's commodity, and at the same time the consumer of the commodity is given the benefit in the form of a reduction or rebate in price, which would otherwise go for the present form of advertising.

It will be seen that my coupon will form an endless chain of advertising at a very small expense to the vendor and the benefits that would otherwise be derived by the advertising concerns will directly go to the consumer of the goods.

Some changes may be made in the arrangement of the various data on my coupon without departing from the real spirit and purpose of my invention, and it is my intention to cover by my claim any data which are an equivalent and which may be reasonably included within the scope of my claim.

I claim as my invention:

A coupon comprising three sections, each section being provided with data relating to the use thereof, the first section being provided with a testimonial statement referring to the goods for which the coupon is used, the second section being provided with a statement of the vendor of the goods used with the coupons as to the worth of the coupon and the third section being a sales or cancellation record for the coupon all for the purposes specified.

Des Moines, Iowa, April 15th, 1921.

EUGENE STEBBINGS.